US012715012B2

(12) United States Patent
Knight

(10) Patent No.: US 12,715,012 B2
(45) Date of Patent: Aug. 25, 2026

(54) SINGLE-POLYMER, RECIPROCATING DISPENSER FOR FOAM PRODUCTS

(71) Applicant: RIEKE PACKAGING SYSTEMS LIMITED, Leicestershire (GB)

(72) Inventor: Simon Christopher Knight, Bridgend (GB)

(73) Assignee: RIEKE PACKAGING SYSTEMS LIMITED, Leicestershire (GB)

( * ) Notice: Subject to any disclaimer, the term of this patent is extended or adjusted under 35 U.S.C. 154(b) by 141 days.

(21) Appl. No.: 18/711,279

(22) PCT Filed: Nov. 21, 2022

(86) PCT No.: PCT/EP2022/082682

§ 371 (c)(1),
(2) Date: May 17, 2024

(87) PCT Pub. No.: WO2023/094336

PCT Pub. Date: Jun. 1, 2023

(65) Prior Publication Data

US 2025/0018411 A1 Jan. 16, 2025

Related U.S. Application Data

(60) Provisional application No. 63/281,152, filed on Nov. 19, 2021.

(51) Int. Cl.
*B05B 11/10* (2023.01)
*B05B 11/00* (2023.01)

(52) U.S. Cl.
CPC ...... *B05B 11/1087* (2023.01); *B05B 11/0044* (2018.08); *B05B 11/1008* (2023.01);
(Continued)

(58) Field of Classification Search
CPC ............. B05B 11/0044; B05B 11/1087; B05B 11/1077; B05B 11/1008; B05B 11/1059; B05B 11/1074; B05B 11/1001
See application file for complete search history.

(56) References Cited

U.S. PATENT DOCUMENTS

| | | | | |
|---|---|---|---|---|
| 4,147,282 A * | 4/1979 | Levy | B05B 11/1078 | 222/387 |
| 5,289,952 A * | 3/1994 | Gueret | B05B 11/00446 | 222/401 |

(Continued)

FOREIGN PATENT DOCUMENTS

| | | |
|---|---|---|
| FR | 2969241 | 6/2012 |
| JP | 2005024100 | 1/2005 |

(Continued)

OTHER PUBLICATIONS

Patent Cooperation Treaty (PCT), International Search Report and Written Opinion for Application PCT/EP2022/082682 filed Nov. 21, 2022 mailed Mar. 2, 2023 International Searching Authority, EP.

*Primary Examiner* — Dariush Seif
(74) *Attorney, Agent, or Firm* — McDonald Hopkins LLC

(57) ABSTRACT

An all-plastic, reciprocating foam dispenser is contemplated. The dispenser relies upon a bellows that also serves as the air chamber/cylinder, thereby eliminating the need for complex valving while also reducing total plastic mass and shortening the axial profile of the dispenser. In this manner, the dispenser can be coupled to narrow-necked containers (≤40 mm diameter) and dispense large doses (≥1.2 mL). A locking collar secures the pump in a sealed, up-locked position, while also providing greater flexibility to adjust the air-to-liquid ratio to help impart the desired consistency to the dispensed foam product.

17 Claims, 9 Drawing Sheets

(piston in slid down position, vs. Fig. 8D)

(52) U.S. Cl.
CPC ...... *B05B 11/1059* (2023.01); *B05B 11/1074* (2023.01); *B05B 11/1077* (2023.01)

(56) References Cited

U.S. PATENT DOCUMENTS

| | | | | |
|---|---|---|---|---|
| 5,326,000 | A * | 7/1994 | Fuchs | B05B 11/1035 222/321.7 |
| 5,673,824 | A | 10/1997 | Santagiuliana | |
| 5,819,990 | A | 10/1998 | Cimentepe et al. | |
| 5,924,603 | A | 7/1999 | Santagiuliana | |
| 6,053,364 | A | 4/2000 | Heijden | |
| 6,068,250 | A | 5/2000 | Hawkins et al. | |
| 6,113,082 | A | 9/2000 | Fujino | |
| 6,223,954 | B1 | 5/2001 | Carrow | |
| 6,983,924 | B2 | 1/2006 | Howell et al. | |
| 7,246,723 | B2 | 7/2007 | Santagiuliana | |
| 7,708,166 | B2 * | 5/2010 | Ophardt | B05B 11/1001 222/207 |
| 8,356,732 | B2 | 1/2013 | Heijden et al. | |
| 8,474,664 | B2 * | 7/2013 | Ophardt | B05B 7/0037 222/207 |
| 8,490,833 | B2 | 7/2013 | Heijden | |
| 8,579,159 | B2 * | 11/2013 | Ciavarella | B05B 11/1067 222/190 |
| 8,616,414 | B2 * | 12/2013 | Ciavarella | B05B 7/0037 222/207 |
| 8,960,507 | B2 | 2/2015 | Sciole | |
| 9,352,347 | B2 | 5/2016 | Arminak | |
| 10,252,841 | B2 | 4/2019 | Knight et al. | |
| 10,350,620 | B2 | 7/2019 | Knight et al. | |
| 10,549,299 | B2 * | 2/2020 | Knight | F04B 43/00 |
| 10,717,565 | B2 | 7/2020 | Knight et al. | |
| 10,723,528 | B2 | 7/2020 | Knight et al. | |
| 10,741,740 | B2 | 8/2020 | Dubois | |
| 10,773,269 | B2 * | 9/2020 | DeJong | B05B 11/1077 |
| 10,898,034 | B1 * | 1/2021 | Arminak | B05B 11/0044 |
| 2004/0149777 | A1 * | 8/2004 | Santagiuliana | B05B 11/1023 222/190 |
| 2006/0237483 | A1 * | 10/2006 | Ophardt | B05B 11/1066 222/207 |
| 2007/0194054 | A1 * | 8/2007 | Ganzeboom | B05B 11/1087 222/190 |
| 2007/0241135 | A1 * | 10/2007 | Santagiuliana | B05B 11/1008 222/321.9 |
| 2009/0102106 | A1 | 4/2009 | Ohashi et al. | |
| 2009/0184134 | A1 * | 7/2009 | Ciavarella | B05B 11/1087 222/207 |
| 2009/0206109 | A1 * | 8/2009 | Santagiuliana | B05B 11/1053 222/145.6 |
| 2009/0294478 | A1 * | 12/2009 | Ciavarella | B05B 11/1087 222/207 |
| 2010/0133300 | A1 * | 6/2010 | van der Heijden | B05B 7/005 222/207 |
| 2010/0140300 | A1 * | 6/2010 | Lewis | B05B 11/1001 222/321.3 |
| 2010/0147898 | A1 * | 6/2010 | Blumenstein | B29C 45/1657 222/402.13 |
| 2010/0193547 | A1 * | 8/2010 | Laidler | B29C 49/06 222/207 |
| 2010/0200615 | A1 * | 8/2010 | Ciavarella | B05B 11/1087 222/207 |
| 2010/0264169 | A1 * | 10/2010 | Crawford | B05B 11/1087 239/34 |
| 2011/0297700 | A1 * | 12/2011 | Santagiuliana | B05B 11/106 222/336 |
| 2012/0325861 | A1 | 12/2012 | Pardonge | |
| 2015/0090741 | A1 | 4/2015 | Laffey | |
| 2015/0223647 | A1 * | 8/2015 | Brouwer | B05B 11/1087 222/190 |
| 2017/0120268 | A1 * | 5/2017 | Ganzeboom | A47K 5/1211 |
| 2017/0157631 | A1 | 6/2017 | Kraus | |
| 2017/0265691 | A1 * | 9/2017 | Ophardt | F04B 53/12 |
| 2017/0266680 | A1 | 9/2017 | Ophardt et al. | |
| 2018/0318861 | A1 | 11/2018 | Knight | |
| 2019/0311587 | A1 * | 10/2019 | Ophardt | B05B 11/1001 |
| 2019/0368567 | A1 | 12/2019 | Deman et al. | |
| 2020/0032870 | A1 | 1/2020 | Deman et al. | |
| 2020/0108406 | A1 * | 4/2020 | Chung | B05B 11/1002 |
| 2020/0384488 | A1 * | 12/2020 | Knight | B05B 11/0044 |
| 2021/0000306 | A1 * | 1/2021 | Arminak | A47K 5/14 |
| 2021/0001358 | A1 * | 1/2021 | Aoyama | B05B 7/0031 |
| 2021/0001361 | A1 * | 1/2021 | Burmann | B05B 11/1059 |
| 2021/0094053 | A1 * | 4/2021 | Deman | B05B 11/105 |
| 2021/0332808 | A1 * | 10/2021 | Chang | B05B 11/1069 |
| 2022/0184650 | A1 * | 6/2022 | Bartolucci | B05B 11/106 |
| 2022/0280962 | A1 * | 9/2022 | Ma | A47K 5/1205 |
| 2022/0331824 | A1 * | 10/2022 | Andrew | F16F 9/0418 |
| 2022/0371037 | A1 * | 11/2022 | Rossignol | B05B 11/00442 |
| 2023/0035772 | A1 * | 2/2023 | Tanaka | B05B 11/1092 |
| 2023/0398562 | A1 * | 12/2023 | Morita | B05B 11/0044 |
| 2025/0018411 | A1 * | 1/2025 | Knight | B05B 11/1047 |
| 2025/0041883 | A1 * | 2/2025 | Zou | A47K 5/14 |

FOREIGN PATENT DOCUMENTS

| | | |
|---|---|---|
| JP | 2010235134 | 10/2010 |
| KR | 102174715 | 11/2020 |
| WO | 1994020221 | 9/1994 |
| WO | 1996028257 | 9/1996 |
| WO | 2001087494 | 11/2001 |
| WO | 2002100554 | 12/2002 |
| WO | 2009016352 | 2/2009 |
| WO | 2010100544 | 9/2010 |
| WO | 2010131042 | 11/2010 |
| WO | 2018126397 | 7/2018 |
| WO | 2020156935 | 8/2020 |

* cited by examiner (gaps in top sleeve)

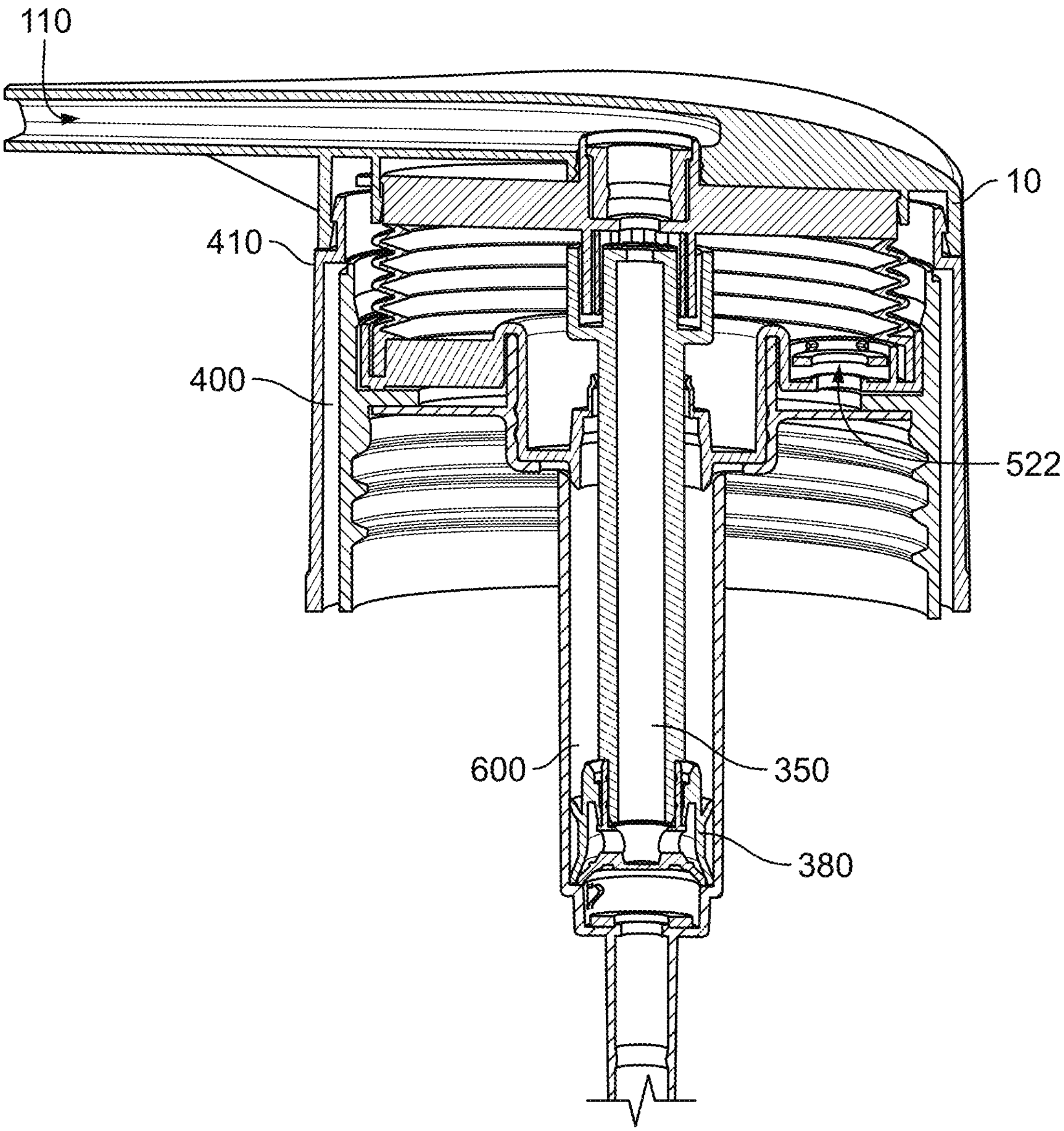
FIGURE 5 (piston in slid down position, vs. Fig. 8D)

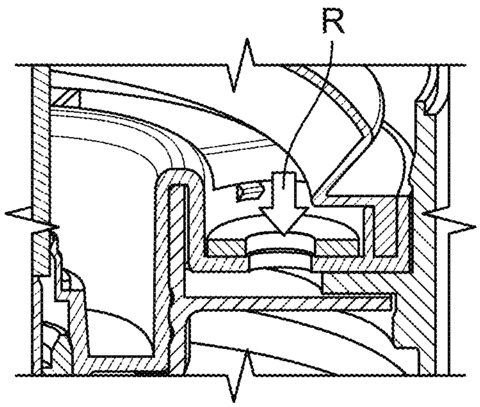
FIGURE 6A
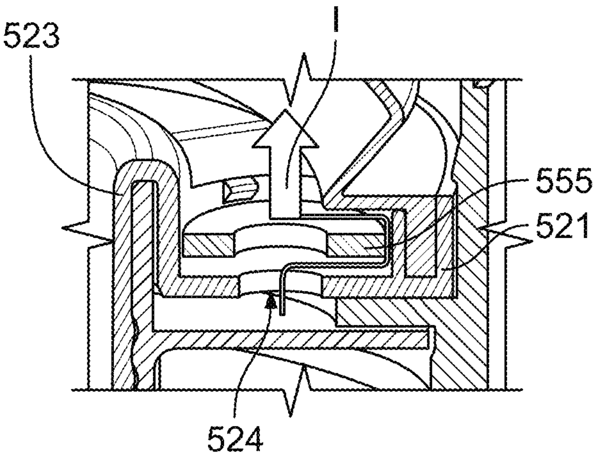
FIGURE 6B
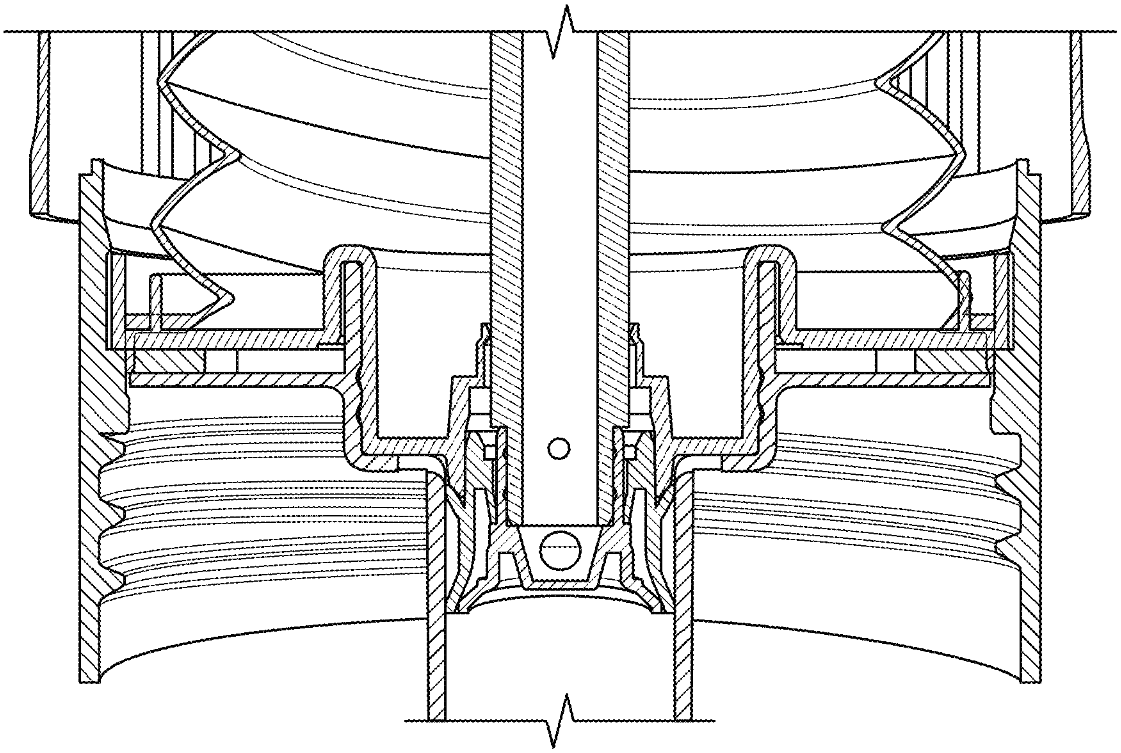
FIGURE 7A (vent overview)

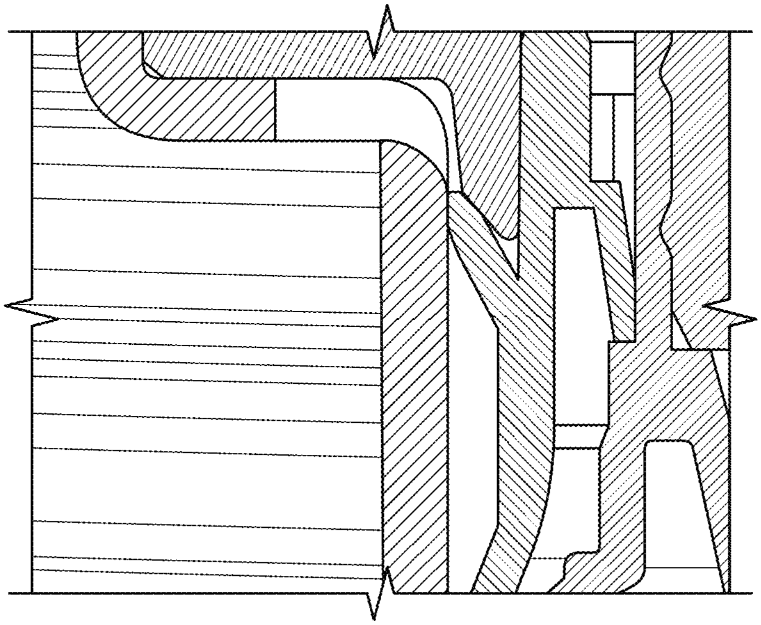
FIGURE 7B (vent block in locked position)
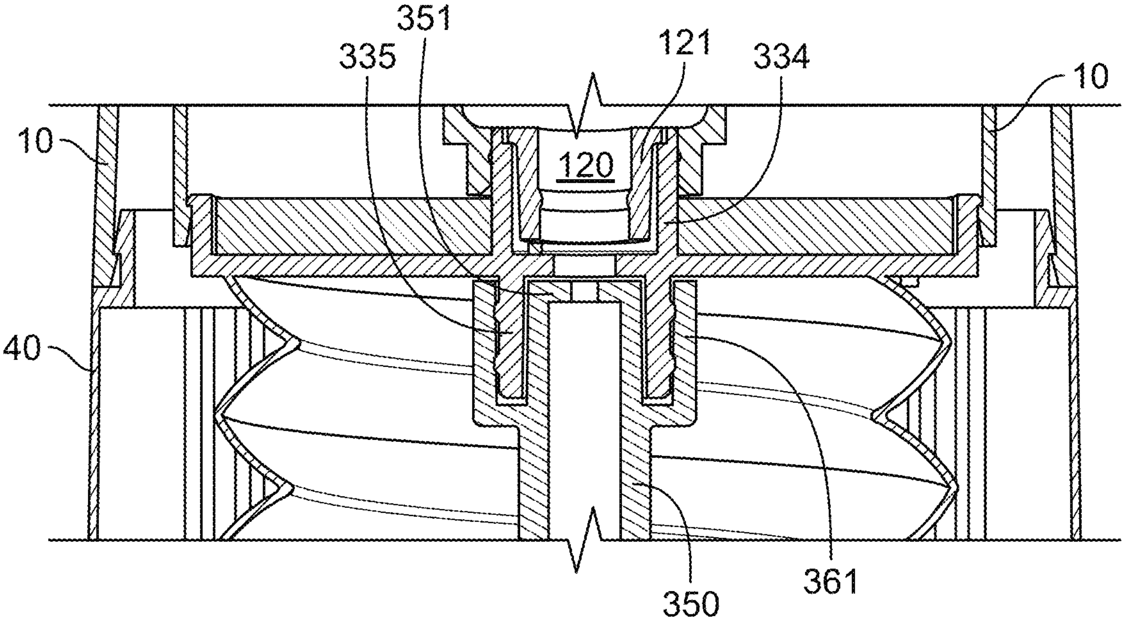
FIGURE 8A
(air flow into mixing chamber and connection of sleeve to head)

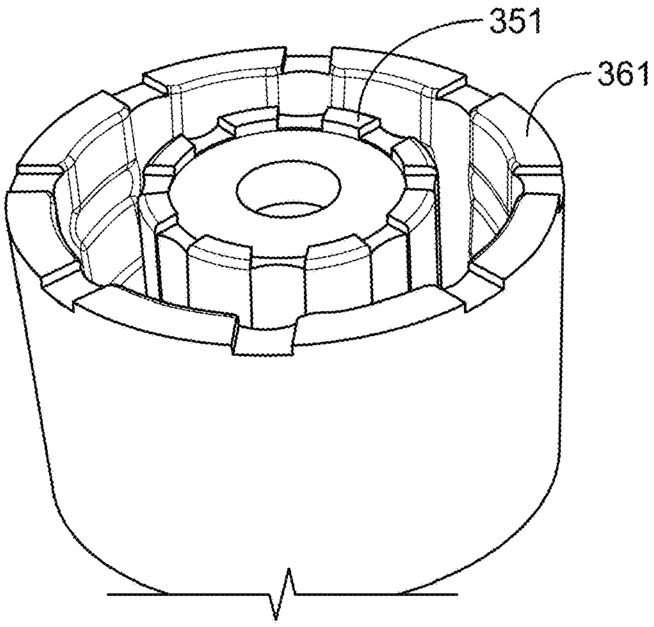
FIGURE 8B (crenellation and axial channels on inner and outer cylinders)
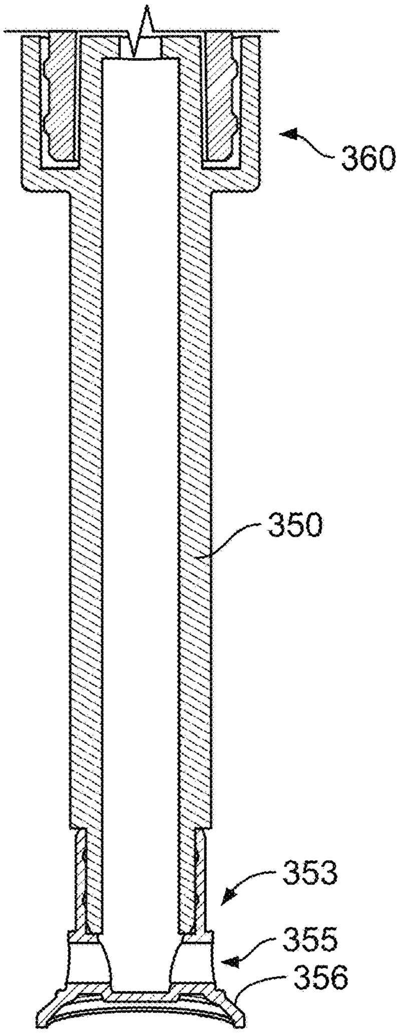
FIGURE 8C (liquid flow into liquid chamber, no piston)

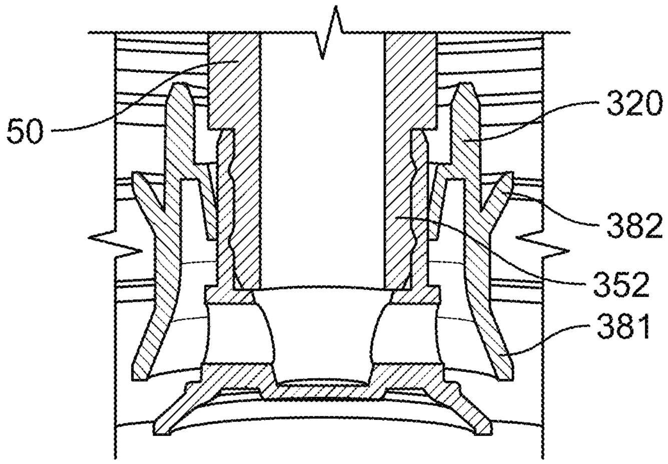
FIGURE 8D
(liquid flow into liquid chamber on downstroke, piston sliding up)
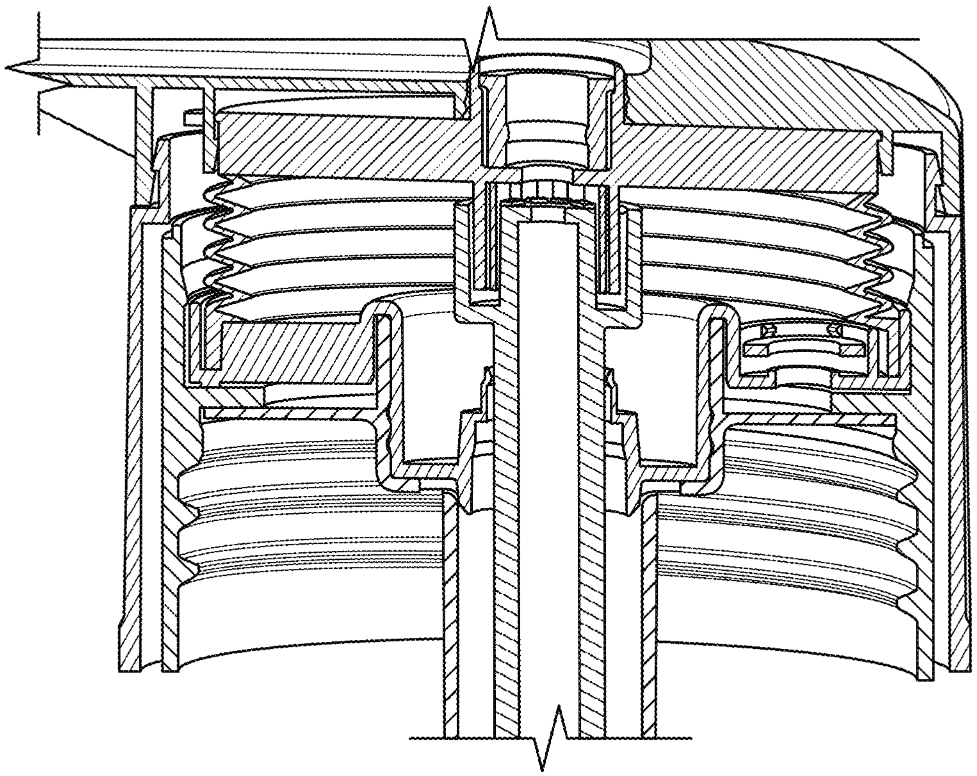
FIGURE 9 (make up air)

(locking sleeve with axial ridges through shoulder stoppers/gaps on closure)

SINGLE-POLYMER, RECIPROCATING DISPENSER FOR FOAM PRODUCTS

CROSS REFERENCE TO RELATED APPLICATIONS

This application is a 35 U.S.C. § 371 national stage application of PCT Application No. PCT/EP2022/082682 filed on Nov. 21, 2022, which claims priority to United States Provisional Patent Application 63/281,152 filed on Nov. 19, 2021, each of which is are incorporated by reference in their entireties.

TECHNICAL FIELD

This application relates generally to pump dispensers and, more specifically, to polymeric pump dispensers, made without metallic components, designed with specific features to make it appropriate for creating and dispensing foams from an upright or non-inverted position, relying upon a reciprocating plunger.

BACKGROUND

Containers for everyday household fluid products, such as soaps, cleaners, oils, consumable liquids, and the like, can be outfitted with dispensing pumps to improve a consumer's ability to access and use the fluid. Dispensing pumps of this type usually rely upon a reciprocating pump, driven by a compressible, metallic biasing member.

These products tend to be single use, thereby giving rise to concerns about sustainability. Increasingly, regulatory authorities are requiring consumer products to use packaging and designs that can easily be recycled. As a practical matter for businesses relying on pump dispensers, it is becoming increasingly important to design these pumps to be made only from polymeric materials and, more preferably, from a single grade of polymer. In this manner, such "all-polymer" pumps can be recycled without the need to disassemble and/or separate out metal parts and components made from difficult to recycle materials. In that regard, metallic or foil parts, thermosetting resins, specialized elastomers, some combinations of thermoplastics, and other materials might be non-recyclable or require temperatures/conditions for recycling that are incompatible with the materials used in the other parts within the design.

When it comes to creating an all-polymer or—more preferably—a single polymer (i.e., "monopolymer") reciprocating pump design, two of the more problematic components are anti-drip nozzles and biasing members. The former are sometimes made from elastomers but, because this is an optional feature, designs can simply eliminate that function or rely on solutions such as those proposed in U.S. Pat. Nos. 8,960,507; 10,252,841; 10,350,620; 10,717,565; and 10,723,528 (all of which are incorporated by reference). However, biasing members are more challenging, because the reciprocating nature of the pump requires driving force and metallic springs provide a cost effective and reliable means of creating the necessary biasing force.

One well known approach is to rely upon a "bellows" as a substitute for a metal spring, such as the ones disclosed in Patent Cooperation Treaty Publications WO 1994/020221A1 and WO 1996/028257A1, as well as U.S. Pat. Nos. 5,673,824; 5,819,990; and 5,924,603. Other proposed solutions for non-metallic springs can be found in Japanese Patent Publication 2005024100A; Patent Cooperation Treaty Publications WO2001/087494A1, WO2018/126397A1, and WO2020/156935A1; French Patent FR2969241B1; Korean Patent KR102174715B1; United States Patent Publications 2009/0102106A1, 2012/0325861A1, 2015/0090741A1, 2017/0157631A1, 2019/0368567A1, and 2020/0032870; and U.S. Pat. Nos. 5,819,990; 6,068,250; 6,113,082; 6,223,954; 6,983,924; 10,741,740; and 10,773,269.

Especially with respect to certain types of soaps and cleaning agents, suppliers prefer to dispense their product in a foamed state. Such foams can be created by mixing a prepackaged fluid with air drawn from the ambient environment. Volumetrically, more air than liquid is normally used to form these foams, with common ratios of air:liquid ranging between 8:1 and 15:1 at preferred foam volume sizes between 0.5 and 2.0 $cm^3$ (with 0.8 $cm^3$ and 1.5 $cm^3$ dose sizes being most common).

The amount of air mixed with liquid to produce foam directly impacts the number of doses a given container size can produce. However, the amount of air mixed with liquid also impacts the characteristics of the foam itself. As more air is introduced, the foam tends to feel "drier" and may retain its shape more readily than a foam having comparatively more liquid. Accordingly, foam dispensers often require very specific dispensing conditions to produce specific characteristics for the dispensed foam. Also, because of their convenience, consumer products sellers with foamed products usually prefer reciprocating style foaming pumps, in comparison to inverted and/or bottle-squeezed foamers (where different driving forces and gravity heavily influence/alter the design).

Conventional reciprocating foam pumps require a biasing member to create movement between an actuator (or plunger) and a fixed element on the container (usually a closure cap coupled to separate chambers liquid and air). These designs rely upon rigid, coaxially-aligned cylinders defining those liquid and air chambers, while a piston moves within at least one chamber to create suction to draw the fluids along their desired paths. Examples of such dispensers can be found in U.S. Pat. Nos. 6,053,364; 8,490,833; 9,352,347; and 10,898,034.

Most of these foaming dispensers rely upon metallic springs, although U.S. Pat. Nos. 8,356,732 and 10,898,034 (the latter having been noted earlier as a monopolymer design, while the former still recommends embedding a metal spring in the bellows) contemplate all polymer designs. These documents contemplate foam dispensers with a bellows or deformable dome-shaped cooperating with separate air and liquid pistons and separate liquid and air chambers confined within a rigid pump body disposed beneath the closure cap. While the '732 patent disposes a sponge that facilitates formation of foam inside of the bellows, air is still drawn from the head space within the container—effectively making the head space the air chamber but thereby requiring air to regularly and freely pass through the closure into the container (creating a potential source of leakage when the pump is handled)—and the overall arrangement positions the bellows prominently above the dispensing outlet so as to make it difficult/impossible for a user to actuate and receive foam with only one hand.

This reliance on rigid bodies for the liquid and air chambers presents further challenges. First, in order to adjust to foam traits (e.g., by changing the ratio of air to liquid), the entire shape of the rigid cylinder(s) must be reconfigured to effect a change to the volume of one or both chambers, thereby requiring a completely new mold for the affected component(s). Second, the rigid cylinders for the air and liquid chambers are often arranged coaxially, thereby making the overall design even more difficult to scale to smaller-necked containers (other than by altering the height and/or diameter of the rigid bodies) when comparatively larger, standard-sized doses/volumes (i.e., at least 1.2 mL or 1.5 mL) of dispensed fluid/foam are still desired. That is, their diameter must be altered, thereby making implementation difficult except in larger necked containers (i.e., at least 40 mm or 43 mm inner diameter), and/or their axial height must be changed, thereby causing dispenser components to occupy more internal volume within the container that would otherwise be available for dispensed fluid(s). As yet another challenge, in designs relying upon a rigid air cylinder disposed proximate to the closure cap and/or piston/stem, undispensed foams trapped in the pump will revert to liquid form over time and flow down into and become trapped in the air cylinder, leading to "freezing" and decreased performance of the pump itself.

Unlike conventional all-liquid or viscous-paste dispensers, foaming dispensers require inclusion of a mixing chamber, as well as separate out-flowing paths for air and liquid, in order to produce foam. Further, the need for "make up" air flowing back into the container to compensate for the dispensed fluid volume, usually by way of a flexible and/or elastomeric "flap" style valve. If make up air is not provided, the resultant pressure differential will cause deformation of the bottle and other difficulties, while the failure to provide a valved inlet for the air creates a potential leakage when the pump is handled. Given these specific requirements for producing foam and for other reasons known to those skilled in this field, foam dispensers are viewed as distinct within the dispensing field, and the incorporation of components from a liquid or paste pump dispensers (or even squeeze or inverted foamers) is usually not feasible for reciprocating/upright foamers.

Lastly, the ability to ship a dispensing pump without it accidentally leaking or actuating is of increasing interest in this industry. Consequently, conventional reciprocating pumps must either be provided with "down-lock" functionality in which additional features (e.g., screw threaded interfaces along the piston/stem proximate to the actuator head and pump body/closure) prevent the actuator head from extending outward. Unfortunately, such features place greater mechanical stress on the biasing member/spring. To the extent that biasing member is plastic, prolonged "lock down" can negatively impact or even cause failure of the spring.

While "up-lock" features do not stress the spring because the head is full extended, a C-shaped clip is usually needed. This clip abuts the actuator head and an unmovable component coupled to the container so as to prevent unwanted down or dispensing strokes from being applied to the actuator head. The drawback with such clips is that they must be removed and discarded, thereby creating additional and undesirable loose plastic waste.

In view of the foregoing, a foaming pump dispenser made only from recyclable polymeric materials would be welcome. Specifically, a reciprocating pump that did not require disassembly and separation of parts into separate recycling streams is needed. Further still, a foaming pump capable of being fitted to standard and smaller sized neck containers, while retaining the ability to adjust the foam characteristics based solely on the selection of a single component, is needed. An all-polymer pump that reduces the total mass of the design without sacrificing the output volume (or, as mentioned above, the desired characteristics) of the dispensed foam would be considered a significant improvement in comparison to the conventional designs noted above. Finally, a foamer having reduced top-to-bottom axial reach and/or a design that decreased the volume of the pump engine contained within the fluid container would be ideal.

DESCRIPTION OF THE DRAWINGS

The appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 5 is a cross sectional side view, taken along an orthogonal angle in comparison to the view in FIG. 4, of the dispenser in its down/dispensing position but with the piston also slide down to block liquid from entering the liquid chamber.

FIGS. 6A and 6B are cross sectional, perspective views of the dispenser of FIG. 1A highlighting the operation of the air valve and the flow of air through the closure plate and into the air chamber.

FIG. 7A is a cross sectional side view of the dispenser of FIG. 1A highlighting the connection of the air chamber/bellows, the closure plate, the cap, and the actuator/piston stem.

FIG. 7B is an isolated sectional view showing how the piston blocks the vent hole when the dispenser is in the up/locked position.

FIG. 8A is a cross sectional side view of the dispenser of FIG. 1A highlighting the connection of the air chamber/bellows, the actuator head, and the piston stem. FIG. 8B is a three dimensional, perspective sectional view of the top portion of the piston stem, highlighting the air flow channels and connection beads/grooves formed thereon. FIG. 8C is a cross sectional side view of the piston stem, without the piston, while FIG. 8D is a cross sectional side view of the piston stem and the piston when the piston is slid upwards so as to allow the flow of liquid into the piston stem as will occur when the actuator head is traveling on its down stroke.

FIG. 9 is a cross sectional side view, similar to that of FIG. 5, highlighting the flow of air and liquid through the dispenser so as to create foam during dispensing/actuation.

FIG. 10A is a three dimensional, cross sectional view of the locking collar, closure plate, and cap while

DESCRIPTION OF INVENTION

Figure 1A:
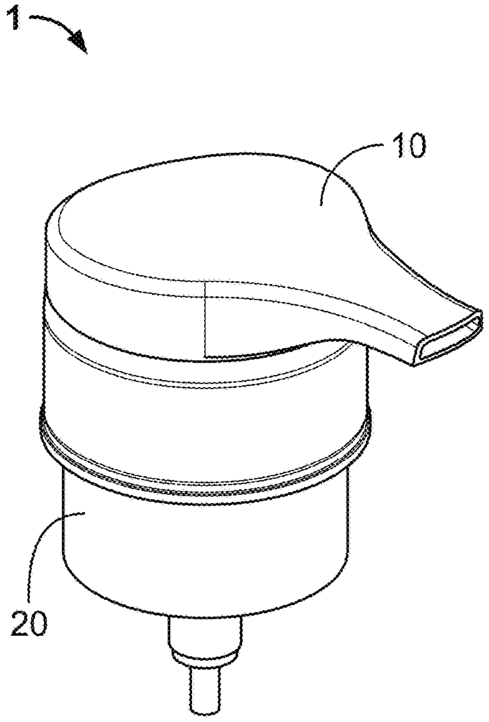
FIGS. 1A and 1B are three dimensional perspective and side views of the dispenser according to certain embodiments herein
Figure 1B:
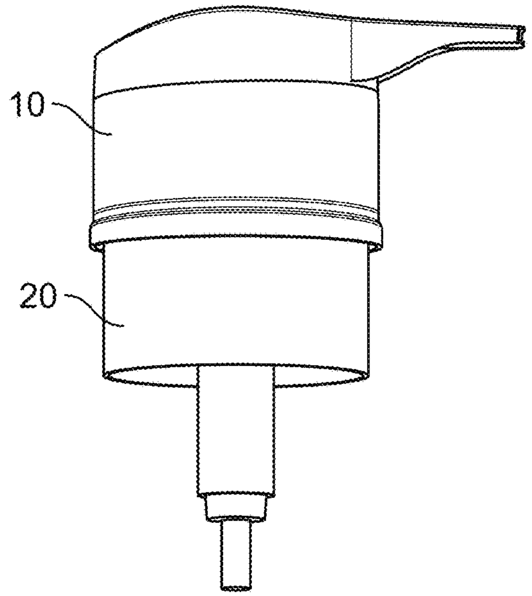
Figure 2A:
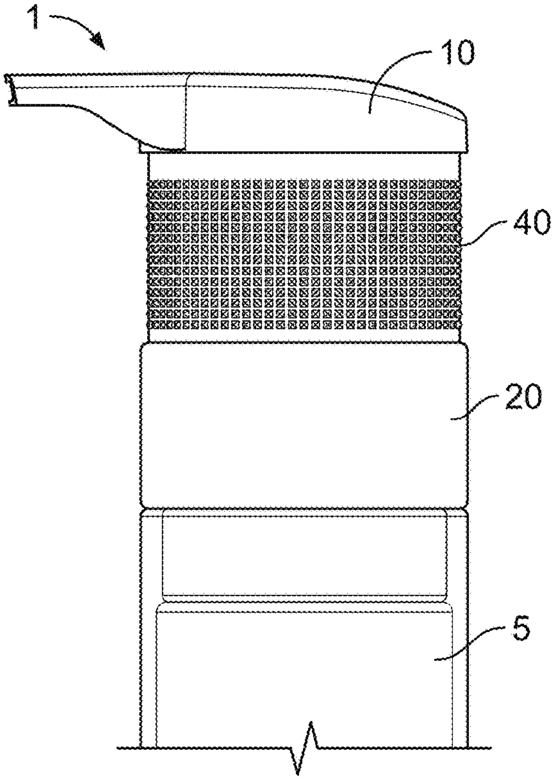
FIGS. 2A and 2B are three dimensional perspective side views of the dispenser of FIG. 1A attached to a container with the locking collar in its up/locked and down/dispensing positions, respectively speaking.
Figure 2B:
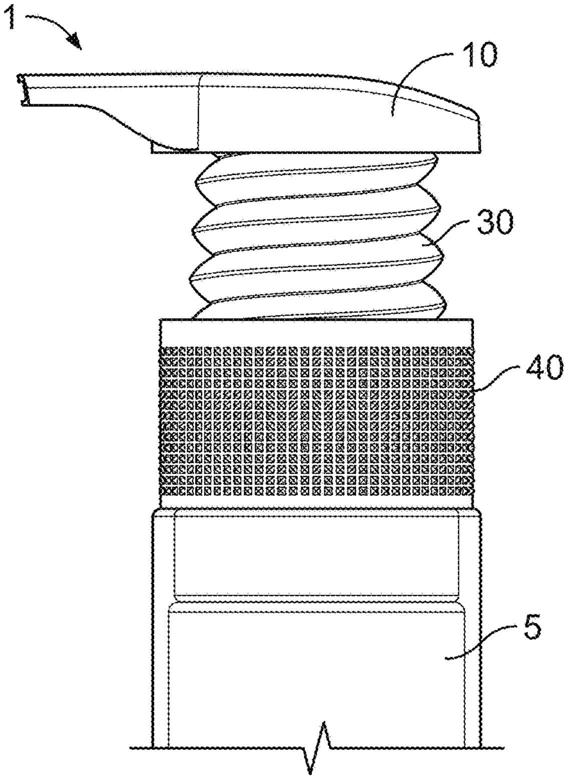

Operation of the invention may be better understood by reference to the detailed description, drawings, claims, and abstract all of which form part of this written disclosure. While specific aspects and embodiments are contemplated, it will be understood that persons of skill in this field will be able to adapt and/or substitute certain teachings without departing from the underlying invention. Consequently, this disclosure should not be read as unduly limiting the invention(s).

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The aforementioned needs with respect to a low-profile, low-plastic-mass foaming dispenser are met by the various embodiments disclosed below. Further, the design and arrangement of the "pump engine" (i.e., the actuator, the liquid and air chambers, the piston/stem, and the biasing member) are ideally suited for narrow-necked containers (i.e., 28 mm, 33 mm, and 38 mm neck diameters), with such narrow-necked containers being preferred and prevalent in consumer applications requiring reciprocating, foaming dispensers.

In addition to the "monopolymer" documents noted above, U.S. Pat. No. 10,549,299 and United States Patent Publication 2018/0318861, along with Patent Cooperation Treaty Application Nos. PCT/EP2020/070871 and PCT/EP2020/070878, all disclose various designs for or components of dispenser pumps constructed completely from polymeric and recyclable materials. These disclosures, along with those referenced in the background of invention section above, are all incorporated by reference as if fully reproduced herein and, thereby, inform and supplement this disclosure with respect to materials selection, construction, processes, and various other aspects of this disclosure and any claims based thereon.

A significant, distinguishing feature of the present invention relates to its biasing member. Specifically, monopolymer designs relying on a stiffened cylindrical wall having a resiliently deformable, segmented top panel or dome possess an unacceptably large diameter/footprint for narrow-necked containers because the deformable top panel/dome requires a comparatively flat, elongated, disc-like shape. Further, substitute such disc-like springs are difficult to substitute in place of elongated, small diameter, metallic coil springs, which can be seated around the reciprocating piston/stem.

Previous attempts to incorporate the conventional bellows-style spring into these narrow-necked designs were not entirely successful. Many of the proposed arrangements could not produce sufficient, reliable spring/suction force within the footprint required by preferred pump engines and container neck sizes. Also, aesthetically, the bellows proved to be difficult to incorporate within a housing, whereas metallic springs are easily concealed owing to their smaller diameter.

One known design, found in U.S. Pat. No. 7,246,723, proposed the use of a bellows in combination with a conventional, rigid-walled air and liquid cylinder arrangement. Here again, the design required coaxially arranged, separate liquid and air positioned above one another, with the piston reciprocating through both. It also imparts a comparatively elongated engine that, like its metallic-spring counterparts, resided primarily within the container (thereby limiting the fluid-carrying capacity of that container). As noted above, U.S. Pat. No. 8,356,732 relies on the container head space to serve as the air chamber entirely, but this design has its own limitations as noted above.

The inventor has now discovered, by reconfiguring the pump engine, it is possible to provide a foaming dispenser that uses a bellows-style spring as both a biasing member and as the air chamber itself. By repositioning the fluid flowpaths—and particularly the route of air flowing into and out of the engine—the need for a flap valve proximate the mixing chamber has been eliminated. At the same time, the inventive pump engine uses less over all plastic mass while producing the same volume of foam.

Additionally, because the air chamber is defined by the bellows/biasing member, alternative pathways for introducing air into the mixing chamber and, separately, as make-up air into the container are now possible. For example, a closure plate is attached to the bottom of the bellows and includes a poppet or disc valve that draws ambient air from the interstices between the closure cap and the closure plate. This air enters the air chamber/bellows and is eventually forced up between the bellows and its connection to the stem.

These changes also lend themselves to the elimination of an liquid outlet/retention valve at the top of the actuator head proximate the mixing chamber. Instead, the only valve required for liquid is at the inlet to the liquid chamber (which coaxially receives the sliding piston and stem). To the extent foam or liquid is entrained within the dispensing channel, these fluids will drain directly back past the mixing chamber and into the liquid chamber without any risk flooding or leaking into the air chamber (owing to the tortuous flow path of air into the mixing chamber and also to the fact that the positioning of the air inlet is at the top of the stem, thereby minimizing the possible accumulation of fluid above that point and minimizing the volume of any back-flow).

Yet another key advantage to this arrangement is that it provides for an overall reduction in the mass of the pump. Further, because all of the pump is formed from polymeric materials (and, more preferably, a single and sustainable polymer such as low density polyethylene or polypropylene), this reduction in mass correlates directly to a reduction in plastic use. This reduction is realized even with the presence/use of a locking collar. Most remarkably, this reduction of plastic mass does not come at the expense of the volume of dispensed fluid or with constraints on adjusting the air-to-liquid ratio to produce the desired consistency of foam. Thus, it becomes possible to dispense large doses of foam while relying on less plastic (and, also, while using a lower profile/axially shorter pump in comparison to conventional designs).

This also provides for a corresponding reduction in the profile (i.e., axial travel height and the perceived size of the head above the collar/closure). In comparison to conventional designs, the inventive pump can be about 5% shorter while providing a greater range of air:liquid ratios, as well as greater flexibility in adjusting those ratios without altering the air chamber itself (i.e., by way of the height of the collar, as described below).

The pump engine is sealed for e-commerce shipping, so that the components remain in an up-lock position, through the use of an integral locking collar. This locking collar is hollow tubular element sized to fit over and cooperate with the actuator head, the stem, and the closure cap/closure plate. The collar is captured between the underside of the actuator head and the container during assembly so that the locking collar remains attached to the dispenser during normal operation (back off ribs and/or ratchets could be provided at the interface of the closure cap and the container to insure the collar remains permanently affixed).

In one aspect, engagement formations couple the collar to the actuator head, which is then rotated into a "locked position" in which the bottom edge of the collar resting on an annular shoulder of the cap, thereby preventing axial movement/actuation of the pump. Gaps in the annular shoulder allow the head to be selectively rotated into an operable position and additional features, such as grooves, ramps, and other cooperating features designed to temporarily impede rotation and/or provide a tactile indication when the proper rotation has been achieved.

In a further aspect, the collar can be configured for tamper evidence by way of frangible bridges that detach the collar from the actuator the first time the collar is released. Still other configurations might include twisting, unscrewing, and/or unsnapping the collar from the actuator head so that the collar slides down and rests partially or completely around the outer circumference of the closure cap.

In the locked position, the sealing interfaces on the piston and liquid chamber are engaged, possibly including radial force to seal the piston to the inner side wall of the body cylinder, when the pump is fully extended. The uplock position also insures that the plastic biasing member will not encounter unnecessary stresses associated with being kept in a compressed position for extended periods of time. It is believed prolonged compressive stress can degrade the performance of the all-plastic biasing member described herein.

When slid down into its unlocked or operable position, the locking collar shoulder may be configured to rest on the container so that the container (and, more specifically, a shoulder on the container proximate to its neck) serves as a stopper to prevent the collar from sliding too far down/out of position. In turn, the top edge of the collar will act as a stopper on the downward motion of the actuator head and the axial height of the collar defines the stroke length of the actuator and the compression of the biasing member/air chamber itself. Even in instances where the collar is configured to serve as tamper evidence so that it becomes permanently detached from the actuator head, the fact that the collar remains captured between the container/closure and the actuator head insures that the collar will serve as a de facto stopper element to limit the downstroke and compression of the bellows.

To the extent a user desires to adjust the qualities or consistency of the foam produced by the dispenser, the air-to-liquid ratio itself can be adjusted simply by changing the axial height of the collar. That is, the height of the collar directly impacts the volume of the air chamber in its extended and maximum compression states, with the difference being the amount of air provided. So, when a larger air-to-liquid ratio is desired, a shorter collar should be employed so as to allow the bellows to become more compressed. In situations where a smaller air-to-liquid ratio is desired, a taller collar can be employed. In either case, these adjustments are affected without altering the diameter or shape of the bellows/biasing member or the liquid chamber itself. Instead, the manufacturer can rely upon a standardized set of collars with differing axial heights so as allow for quickly and easily changing the air-to-liquid ratio without physically altering the pump engine itself.

The biasing member is injection molded or otherwise formed from a similar polymeric material to that used for the other components. The biasing member preferably has a spiraling, corrugated surface, so as to impart resilience when the cylindrical/cone shaped member is compressed along its axial height. A stiffening rib may trace the helix structure to impart further resilience and structural integrity. In some aspects, the bellows may simply be formed as an accordion, without a spiraling helix. But in all aspects, the biasing member encompasses a solid wall that forms a hermetic seal with the components coupled to the biasing member, so as to allow the interstices of the biasing member to serve as an air chamber for the pump.

Separate flanges provided on the flattened interfaces at the top and bottom of the biasing member allow for it couple to the actuator head, closure cap, and/or closure plate. These interfaces may include recessed shapes, separated/defined by radial ribs and inner and outer circular walls at the top. Both the top and the bottom of the bellows can also include an axially extended flange or sidewall, into which air flow passages (e.g., notches, crenellations) and/or coupling formations are provided on an outer and/or inner radial facing, with the air flow passages aligned vertically with the central axis of the bellows. These features on the top and bottom flanges can facilitate the plastic biasing member within the broader pump, as described herein.

A closure plate is coupled to the closure cap and the liquid chamber, with the biasing member coupled to the top facing of this assembly. Together, these components are attached to the container neck. The closure plate and cap define an air inlet path, with a vent aperture in the closure plate sealed by a disc or poppet valve that is drawn upward as the biasing member returns to its original, extended shape. This allows ambient air to floor into the air chamber. Notably, this air is subsequently forced into the mixing chamber through a path defined by the biasing member and the actuator head when the biasing member is compressed (i.e., on its downstroke). Further, the use of a simple disc valve eliminates the need for complex cylindrical, flap valves typically found in conventional foamers.

The closure plate conforms to the top portions of the pump body/liquid cylinder so as to define a venting path allowing for air to communicate between the liquid chamber and internal volume of the container (described below). Both the closure plate and the liquid cylinder are configured to receive the lower extremities of the piston and stem that are attached to and move in concert with the actuator head. Specifically, the wipers of the piston sealing engage the inner facings of the liquid chamber so as to alter its volume and draw liquid in (on the upstroke) and expel liquid previously pulled into that chamber (on the downstroke). These wipers also block and seal the vent path when the pump is in its uplocked position.

The closure cap is configured to couple to the closure plate and, optionally, flanges extending from the pump body/liquid chamber along an inner facing of the cap structure. Notably, the cap does not have a closed, cup shape and, instead, forms a cylinder with an inwardly protruding radial flange. This flange includes an aperture to receive the closure plate, liquid chamber, and piston/stem. On the lower portion of the cap, threads or engagement features are formed to cooperate with corresponding features disposed on the container neck (as shown in its conventional form, the threads are typically disposed on the inner facing of the cap and the outer axial surface of the container neck, although this arrangement could be reversed).

The liquid cylinder is the only portion of the pump engine that protrudes into the internal volume of the cylinder. It includes an inlet at its lower end that is sealed by a conventional inlet valve, such as a ball or a disc/flap contained within an appropriate structure. This valve is drawn upward and displaced on the upstroke of the biasing member so as to pull liquid into the chamber.

Unlike the conventional designs noted above, this arrangement does not require an outlet valve. Instead, the axial/linear arrangement of the flow path and mixing chamber causes foam that is not dispensed to simply fall back into the liquid chamber, with the tortuous air flow into the mixing chamber preventing foam/liquid from leaking into the air chamber.

The actuator head is coupled to the biasing member at its top end. This head defines a flow path and outlet for foam formed in the mixing chamber. The hollow tubular mixing chamber itself includes a foam forming element such as mesh or a sponge and is carried between the biasing member and the lower extremity of the actuator. An annular skirt extending down from the head may include features to couple and/or release the locking collar and the head.

A stem also attaches to the biasing member/actuator head, with the stem itself attaching to a piston with wiper assembly. This stem moves in concert with the actuator head, and the biasing member operates to return these components to an extended position. The interface between the stem and the biasing member is configured so that air flows from the air chamber into the mixing chamber. As noted above, the flow path should have a sufficiently elongated tortuous or U-shape path to minimize and prevent liquid from flowing into the air chamber.

Generally speaking, any interface between the components where air flow is intended (e.g., between the closure cap and the closure plate, between the bellows and the stem, between the stem and the closure plate, etc.), the interfacing surfaces can be imparted with features to facilitate communication. That is, grooves or projections (aligned axially, radially, or in a tortuous or serpentine path) can be formed in one of both of the adjoining surfaces, and crenellations, gaps, or labyrinthine-style formations can be formed at any terminal or peripheral edge. FIG. 8B provides an illustration with respect to the top end of the stem, but it will be understood these principles can be applied to any of the interfacing surfaces where air must selectively pass therethrough.

Partial, intermittent, or completely circumferential bead and groove, bayonet-style slot and groove, tab-and-shoulder, or other interference fit features are provided at numerous interfaces to seal the components and insure their movement proceeds as intended. In particular, these features can be found at the following connections: where the closure plate connects to the liquid cylinder, where the stem connects to the biasing member, where the mixing chamber is seated in the bellows, where the bellows couples to the closure plate, where the bellows couples to the actuator head, where the locking collar couples to the actuator head, where the closure cap couples to the closure plate and/or liquid cylinder. Particularly with respect to the locking collar connection, these features can be selectively released and re-engaged.

FIGS. 1A-10B illustrate specific aspects of the aforementioned features and how they are configured (individually and in combination with one another). First, FIGS. 1A-2B illustrate foam dispenser 1, which generally includes an actuator head 10 and closure assembly 20. The closure 20 is affixed to a container 5. Collar 40 is captured between the head 10 and the closure 20 when the dispenser 1 is assembled. Collar 40 may moves along the dispensing axis (in FIG. 1B, vertically) to selectively conceal biasing member 30. As noted elsewhere herein, collar 40 also selectively engages the actuator 10, the closure 20, and/or the top portion or shoulder of container 5 so as to provide certain advantages with respect to locking and control of the dispensing stroke.

Figure 3A:
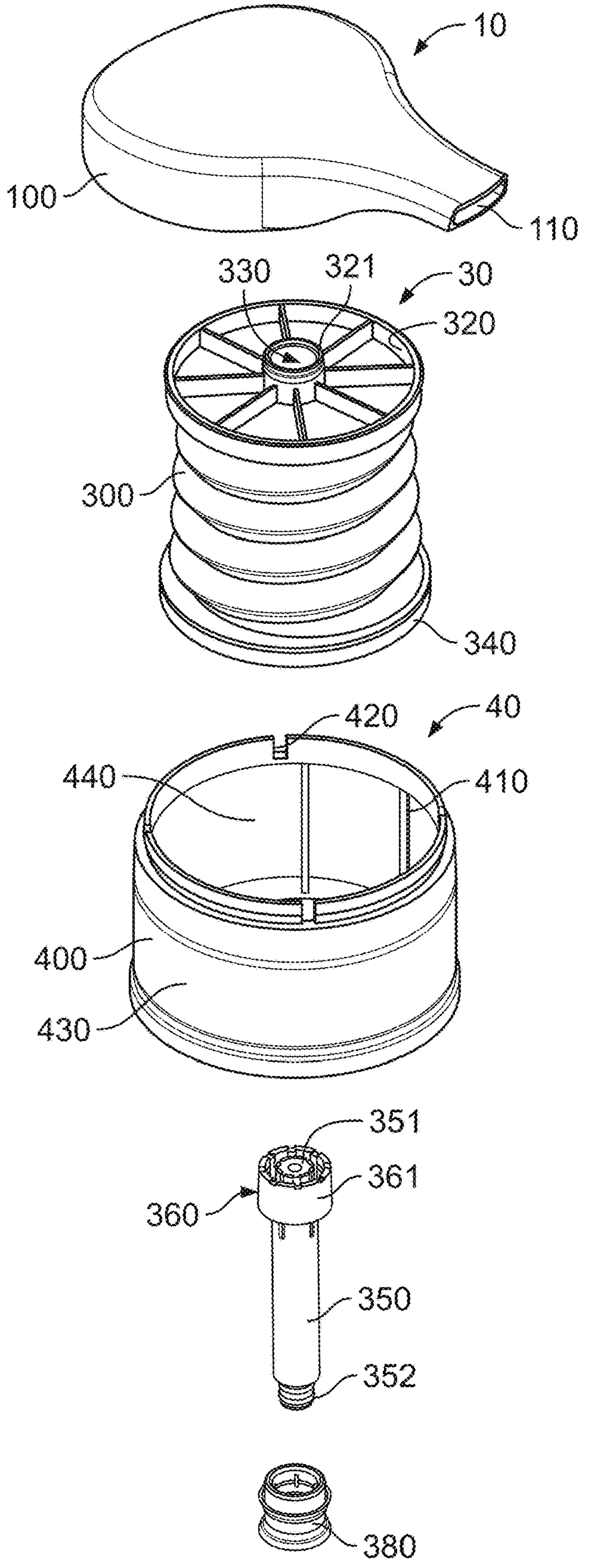
FIGS. 3A and 3B are a three dimensional exploded view of the components of the dispenser of FIG. 1A.
Figure 3B:
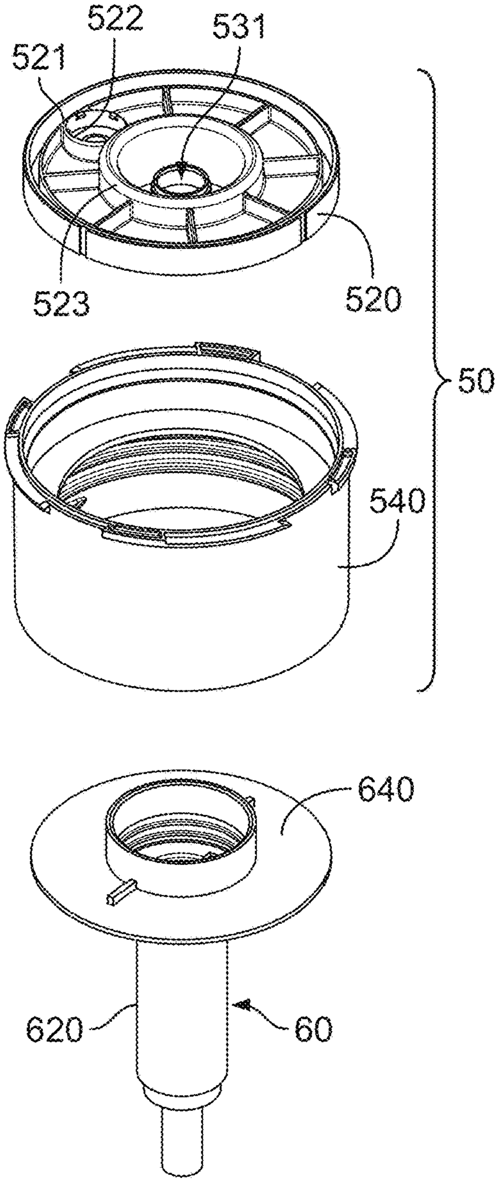
Figure 4:
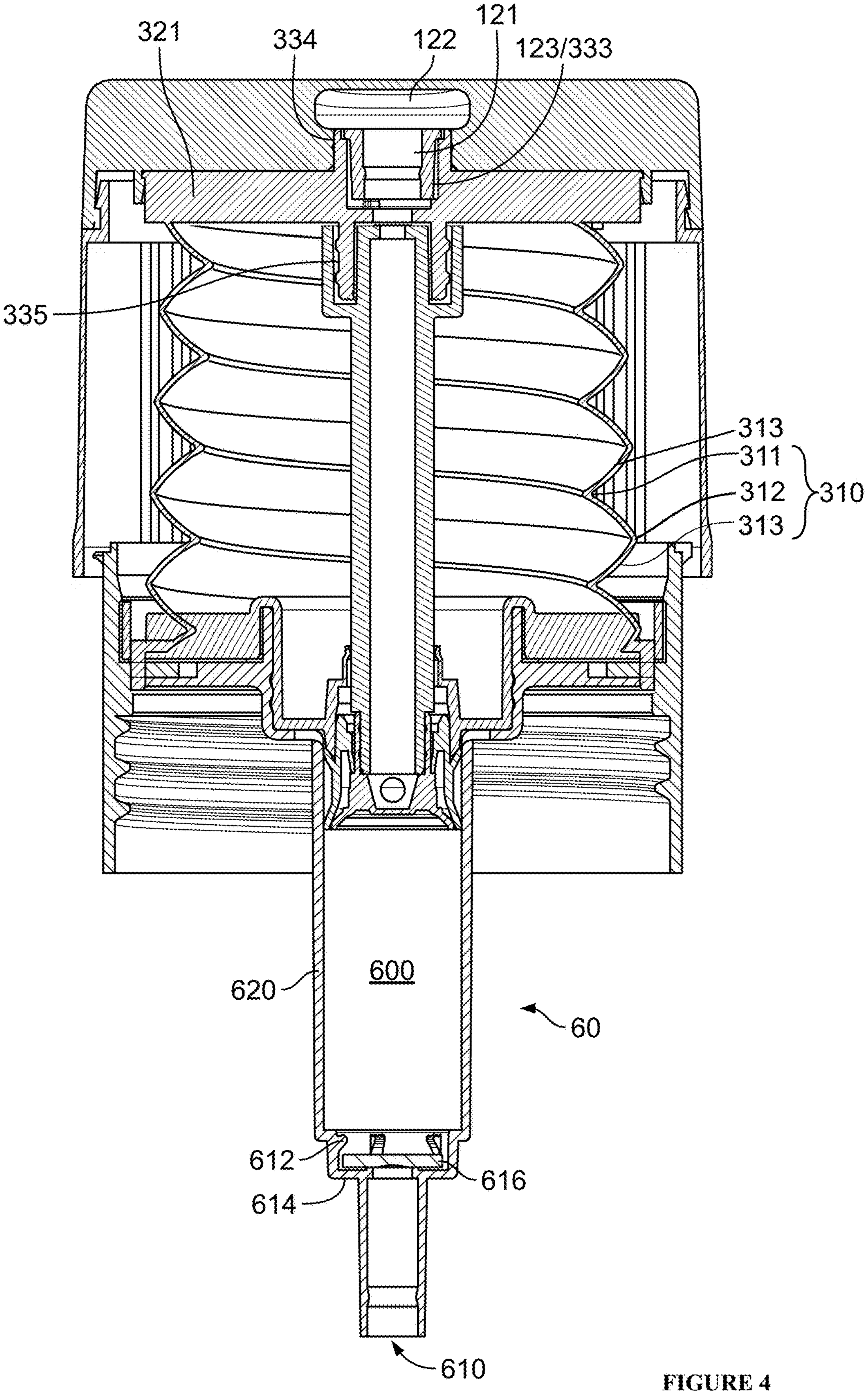
FIG. 4 is cross sectional side view, taken along an orthogonal angle in comparison to the view in FIG. 1B, of the dispenser of FIG. 1A in its extended position and the locking collar rotated to an unlocked/dispensing position.
Figure 10A:
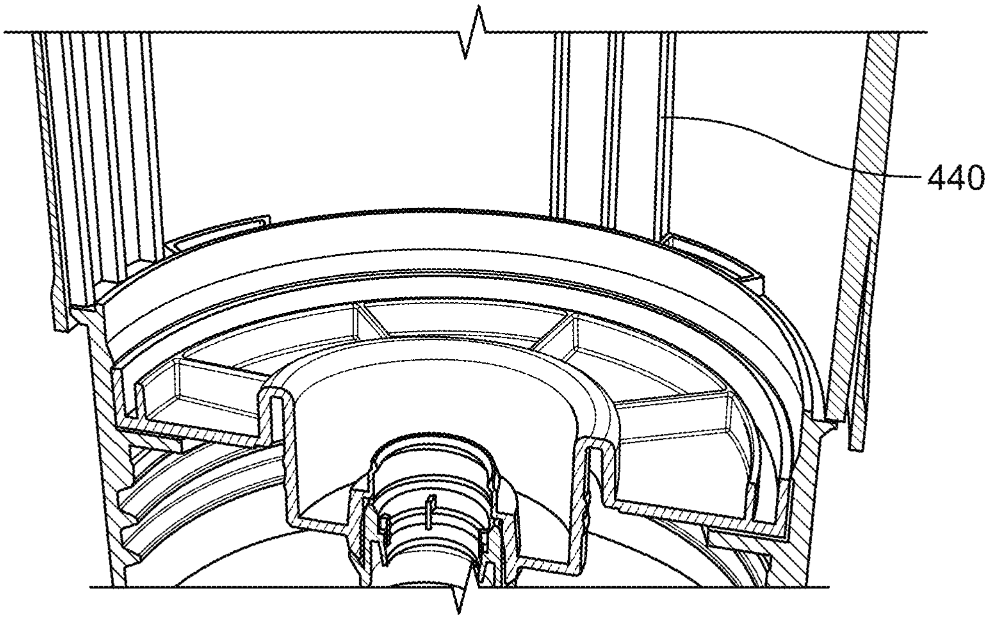
Figure 10B:
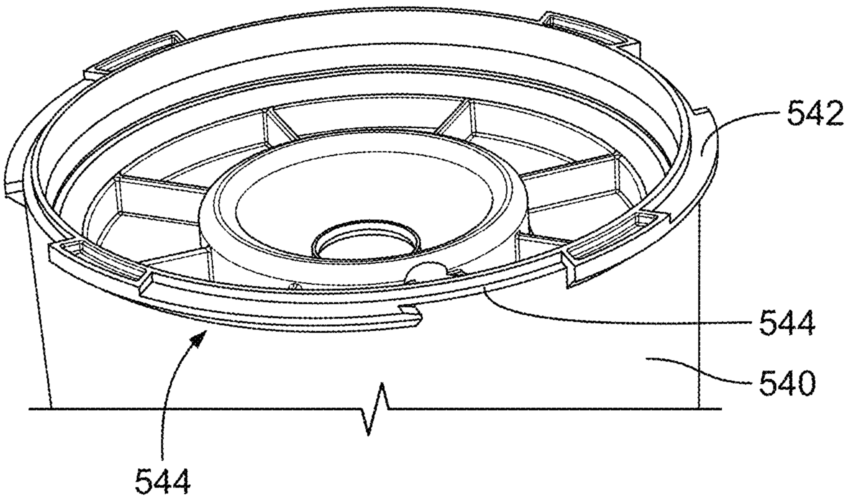
FIG. 10B is a three dimensional, perspective view of the cap and the closure plate, with both highlighting operational features of the locking the collar.

In FIGS. 3A-3B, an axially exploded view of the relative arrangement of the components can be seen in greater detail. Actuator head 10 includes a body 100 with a nozzle or outlet 110. This outlet 110 defines one end of the outgoing flow path from the dispenser 1.

Biasing member 30 includes a cylindrical or frustoconical body 300. Body 300 includes flattened top end 320 and bottom end 340, each of which can be coupled to their adjoining components in the actuator 10 and closure 20, respectively speaking. In some aspects, the body 300 is made entirely of resilient plastic, with a spiral, helix, or accordion-style segments 310 providing resilience and allowing the body 300 to be compressed along the dispensing axis. Each segment 310 includes a minimum diameter 311 and maximum diameter 312 with resilient connecting sections 313 interposed therebetween and with the segments 310 arranged so that every minimum diameter 311 is abutted by a maximum diameter 312 and vice versa. Preferably, the maximum diameter 312 traces a spiral or helix along the surface or sidewall of the cylinder/cone 300.

Body 300 includes a top panel 321 which may have annular ridges, radial ribs, and/or other strength-enhancing features. A central aperture 330 includes a cylindrical well that receives or defines a mixing chamber 120. Chamber 120 may comprise a separate hollowed tube or skirt 121 with one or more mesh or foaming-forming structures 122 spanning the inside. The inner volume of the chamber communicates with the aperture 330 on one end and a flow channel 111 formed within the head 100 on the other end. Flow channel 111 terminates at outlet 110. The outer facing of chamber 121 can include engagement features 123, such as beads, grooves, etc., that cooperate with corresponding features 333 formed on/proximate to the aperture 330.

Aperture 330 may be surrounded by axially extending walls 334, 335 above and below panel 321, in which case the aforementioned well is defined by one or both of walls 334, 335 so that features 333 are formed on the inner facing thereof. Wall 335 extends below panel 321 and couples to the stem 350.

Stem 350 is an elongated cylindrical tube oriented along the same axis as the biasing member 30. At its top end, a coaxial cup 360 defines a gap between the main portion of the tube 351 and the upwardly extending sidewall 361 of the cup. As better highlighted in FIGS. 8A and 8B, the top edges and inner and/or outer facings of the walls 351, 361 can include channels, grooves, crenelated edges, and other similar structures to facilitate air flow from the air chamber defined by the inner volume of biasing member 30 into the mixing chamber 120. As noted below, air enters the air chamber via vent 524, with the flow initiated/driven by the reciprocating action of the spring 30 as it depressed and returns to its original shape.

The lower end of stem 350 is adapted to couple to a sliding piston 380. As will be described below, liquid fluid flow paths are provided in the interface between the tube 352 and the piston 380. Similarly, at the top end where stem 351 couples to the biasing member 30 (i.e., at aperture 330 and, more specifically, along its sidewall 335), formations are provided to allow for air flow. The liquid and air flowing through these interfaces are introduced to the mixing chamber 120, thereby producing foam that is expelled from the outlet 110 when the pump 1 is actuated.

The bottom end 340 of biasing member 30 includes an aperture 331 aligned with and, preferably, slightly larger than aperture 330. Stem 350 extends down through aperture 331, closure 50, and into the liquid body cylinder 60. Peripheral edge 341 includes a flange and/or extension wall that couples to the closure 50. The interface of edge 341 and closure cap 520 is configured to allow air to flow between these components and communicate with the valve formed in the closure plate 540 of closure 50.

Locking collar 40 is dimensioned to slide over the biasing member 30. Side wall 400 includes a coupling feature 410 for attachment to the head 10. Feature 410 might include tabs, grooves, or bayonet-style connectors coupling to a corresponding feature on the head 10. Periodic circumferential gaps 420 can be formed to allow the side wall 400 to be deflected so as to disengage the coupling of feature 410 to the head. 10. Thereafter, the collar 40 can be slid down and away from the head, provided, the blocking ribs 440 are aligned with corresponding gaps 544 formed in a radially extending flange or shoulder 542 of closure 50. Otherwise, ribs 440 and abutting end 430 are formed to engage the closure cap on the shoulder 542 to prevent the collar 40 from moving down. Thus, the ribs 440 are configured so that, when the collar 40 is rotated relative to the closure, the dispenser is uplocked (ribs 4440 resting on shoulder 542) or operable (ribs 440 sliding through gaps 544). In some aspects, the collar 40 may also be releasably coupled to the actuator 10 (e.g., bayonet-style coupling features on/near end 430 and correspondingly on the inner or outer facing of the sidewall/skirt on actuator body 100) so that the collar 40 may be pulled down over a portion of the closure cap 540 to allow compression of the actuator 10 and biasing member 30. In a further aspect, one or a series of shoulders could be formed in step-like fashion on cap 540 to allow for different actuation stroke lengths (and, by extension, different dose volumes). Further still, ramps or protrusions could be formed at the interface between the ribs 440 and should 542 to provide some minimal resistance so as to keep the orientation of the collar 40 in the locked or operable position.

Closure 50 includes closure plate 520 snap-fitted or coupled to the cap 540 to impart a cup-like shape to the closure (but with a central aperture that allows the stem 350 to pass therethrough). The cap includes threads or other features that allow it to be selectively coupled to a container neck having similar features. As noted above, the components of pump 1 allow for the cap 540 to have standardized dimensions accommodating short or narrow neck inner diameters. As such, the pump 1 allows for an adjustable foaming dispenser (again, as noted above).

Closure plate 520 includes a central aperture 531 corresponding to aperture 331. Any number of annular ridges, radial ribs, and/or other strength-enhancing features may be formed in or on the top and/or bottom of the plate 520. A vent well 522 may be positioned between peripheral extension wall 521 and central extension 523.

Central extension 523 may conform to a cooperating protrusion or axially extending wall on the liquid body cylinder 60. Additionally or alternatively, extension 523 may include bead and groove or other coupling formations to engage and attach the closure 50 to the cylinder 60. Extension wall may be a single axially extending wall or a pair of spaced apart walls that receive edge 341 on the biasing member 30. Here again, coupling features can be provided at this interface to improve the fit and attachment of the components 30, 50.

Additionally, the interface of the edge 341 proximate to wall 521 includes air flow formations (channels, grooves, crenelated edges, etc.) that allow ambient air to flow through the interface and toward the air inlet aperture 524. Valve 555, preferably in the form of a disc that is restrained within the vent well 522 by radial projections or other integral formations on the plate 520. Because the biasing member 30 is hermetically sealed to the closure 50 (except for the air inlet at aperture 524 and outlet into mixing chamber 120).

As the air chamber/biasing member 30 expands and returns to its original volume, air from the ambient environment is drawn into the air chamber between the interface of the biasing member 30 and closure 50 and through the inlet 524, with valve 555 being temporarily displaced/suctioned upward as indicated by arrow I. Once this ambient air fills the chamber (i.e., the negative pressure differential equilibrates), the valve 555 returns to its resting position, as indicated by arrow R. Upon subsequent compression of the biasing member 30, the air is then forced through the interface between the biasing member 30 and the actuator head 10 (and, more specifically, the stem 350 connected to it) so as to supply air to the mixing chamber 120. Some of this air may also be forced down through the interface of the closure 50 and body cylinder 60 (and, more specifically, into/through vent 602) to restore pressure/air to the internal volume of the container.

Body cylinder 60 includes a hollow tubular portion 620 that serves as the liquid chamber 600. Inlet 610 is at the lower end of chamber 600, and it may include a radial shoulder 612 that serves as a stopper for the downward motion of the stem 350 and piston 380. A second should 614 may be axially beneath should 612 and configured to cooperate with valve 616. The valve 616 may be a flap or disc similar to the structure of valve 555 (possibly including retaining projections), or it can be formed as a more conventional ball-type valve.

Chamber 600 has smooth sidewalls configured to allow the piston to slide freely. Piston 380 may include upper and lower annular wipers or ring elements 382, 381 that sealingly engage the sidewall 620. This seal allows for liquid to be drawn through the inlet 610 and retained the chamber 600 so that on subsequent actuations of the stem 350 the liquid in chamber 600 is then forced into the mixing chamber 120.

Notably, stem 350 includes a radially orient inlet 355 with a third wiper element 356 positioned beneath the inlet 355. A thinned wall section 353 immediately above the inlet 355 include engagement features on its outer facing to attach to the piston 380. Notably, the portion of piston 380 carrying the wipers 381, 382 allows these wipers 381, 382 to slide within the narrow axial range defined by thinned section 353 (possibly with a shoulder on the piston 380 serving as a stopper element 0. Thus, on the downstroke of stem 350, the wipers 381, 382 are pushed upward to allow liquid to flow into the inlet 355, as seen in FIG. 8D. Conversely, as the stem is pulled upward on the return stroke, the wipers 381, 382 are pulled downward so that wiper 381 closes the inlet 355 and makes contact with the third wiper 356 to hold liquid in the stem 350, as seen in FIG. 5.

A vent aperture 602 is formed at the junction of sidewall 620 and a radially extending flange 640. As seen in FIG. 9, the vent 602 allows for make-up air to enter the container when the biasing member 30 is compressed. Specifically, air from the air chamber (defined by biasing member 30) flows between the closure plate 320 and stem 350 interface (again, possibly provided with grooves or channels), into the chamber 600 above the piston 380, and through the vent 602 into the internal volume of the container.

FIGS. 7A and 7B show that when the pump 1 is in the extended position, the upper wiper 382 is positioned to seal the vent 602. Thus, the pump 1 is designed to remain sealed when not in use, while the locking collar 40 may be deployed to prevent actuation. This enables the container to remain sealed while simultaneously insuring the biasing member 30 is not subjected to unnecessary compressive stress.

The radial flange 640 may have a stepped profile that conforms to the closure plate 520. An upper extension cylinder 642 may be received within the gap formed by walls 523 of the plate 520. The outermost periphery of the flange 640 extends radially outward to seal to a shoulder or inward shelf formed on the closure cap 540. Along these interfaces, any of the aforementioned coupling features may be employed.

Notably, for interfacing components where air or liquid flows are expected, FIG. 8B is particularly informative. Here, axially aligned channels are provided on the facings walls 351, 361 that otherwise abut with and seal to the cylinder 335 of the biasing member 30 (not shown in FIG. 8B). The channels flow up to a series of protrusions, having a crenelated appearance so that air also flows over the top/edge of walls 351, 361 (with a horizontal planar surface otherwise sealing these top edges). Further still, one or more circumferential beads or grooves can be disposed on these same facings. Cooperating beads or grooves of the same size, shape, and spacing are provided on the sealing surfaces (not shown) to securely couple the components, while the channels permit the fluid flows. This type of arrangement can be employed throughout the dispenser 1, wherever sealing and fluid flow are simultaneously required/desired.

One direct advantage of the foregoing components and arrangements is that they create a reciprocating foam dispenser pump of reduced weight (in comparison to conventional foamer pumps, like those mentioned above) that can still be fitted to large or narrow-neck containers (specifically including 28 mm, 33 mm, and 38 mm inner diameters) and without a reduction in the standard dose volume (e.g., 0.8 mL, 1.2 mL, 1.5 mL, and the like). In this regard, it should be appreciated that, while metals such as steel may have a density that is 7-8 times greater than that of polyethylene, the physical size and total mass of steel required for a coil spring is at least an order of magnitude smaller than the mass of plastics required to form a bellows (which has larger diameter and surface area). Thus, this reduction in weight should not be interpreted as a byproduct of eliminating metal. Instead, the reduction of total mass in the inventive designs herein (which necessarily entails a reduction in the use of plastic) is attributed to the elimination of a reduction of plastic parts (e.g., no need for a separate air cylinder/rigid chamber, elimination of an outlet valve proximate the nozzle/outlet of the actuator, etc.) and a shrinking of the overall footprint for the dispenser (e.g., shorter axial travel for the actuator, narrower diameter to accommodate narrow-neck containers, etc.). That is, by combining the air chamber and the biasing member (i.e., the bellows), the inventors have achieved a foam dispenser with decreased plastic mass that is still capable of being directly substituted on any sized container while still delivering acceptable dose volumes.

For example, Table 1 provides a comparison the total weight of an embodiment of the inventive pump against several conventional designs commercially available as of the time of this application. Thus, in comparison to the physical features noted above, the invention can further be characterized by the reduction in total mass in comparison to the neck size of the container, the amount of foam delivered, and/or its ability to provide a locking mechanism that the pump may be shipped in e-commerce conditions without the need for further packaging or safeguards against leakage/unwanted actuation. These advantages are in addition to the lower profile (i.e., reduced volume in the container and/or reduced axial height of the pump engine and actuator) and the other items mentioned above.

TABLE 1

Comparison against conventional reciprocating foam dispensers.

| Pump ID | Inventive | Conv. 1A | Conv. 1B | Conv. 2 | Conv. 3 | Conv. 4 |
|---|---|---|---|---|---|---|
| dose (mL) | 1.5 | 1.5 | 1.5 | 0.8 | 0.8 | 0.8 |
| air:liq. ratio | 10:1 | 8:1 | 10:1 | 10:1 | 15:1 | 15:1 |
| neck size (mm) | 40 | 40 | 40 | 43 | 43 | 43 |
| axial travel of stem/head (mm) | ~18 | ~19 | ~19 | ~19 | ~19 | ~19 |
| total mass (g) | 23.0 | 28.4 | 31.4 | 32.7 | 37.3 | 36.2 |
| lockable (e-com shipping?) | yes | no | no | yes | yes | yes |

Thus, in some aspects, the inventive foam dispenser has a total mass (in grams) to dose dispensed ratio (in mL) that is less than 20, less than 18, and less than 16. It will, of course, be understood, that the lower end of this ratio can approach 1, but is likely to remain above 1, above 5, and above 10 because of the need to for the dispenser to possess sufficient mass to include the components described herein. Still other advantages in comparison to the prior art can be calculated based upon various combinations of the variables provided in Table 1, as well as by relying upon the description contained herein.

These reduced ratios are enabled through any combination of the following: relying upon the biasing member to serve as the air chamber, providing only one air inlet valve and one liquid inlet valve without the need for a third outlet valve (controlling/preventing the flow of foam or fluids back into the pump engine), and eliminating the need for flap valves.

The biasing member and other components described herein can be injection molded from a single polymeric material, similar or identical to the remaining components. Polypropylene, polyethylene, and other compatible and/or similar recyclable polymeric resins are particularly useful.

With respect to the helical nature of the biasing member, the depiction of a specific chiral configuration is not intended to be limiting. Thus, left-handed and right-handed helices are possible, so long as the inner and outer helical traces remain complimentary (i.e., both run in the left-handed or right-handed direction).

The remaining features of the pump relate to its basic function. For example, a dip tube ensures fluid can be drawn up from the internal volume of the container. An inlet valve, such as a ball valve, controls the flow of fluid into the pump chamber. The container is configured to couple to the pump body, usually by way of a threaded connection, so that the pump engages a corresponding set of features at or proximate to the container mouth. The container itself must retain the fluid(s) to be dispensed and possess sufficient rigidity and/or venting capability to withstand the pumping motions and attendant pressure differentials created by the structures disclosed herein.

In one aspect, the invention contemplates a reciprocating pump for dispensing foam products. The pump has an actuator defining an outlet for dispensing a foam product; a mixing chamber communicating with the outlet; a resilient, compressible bellows defining an air chamber coupled to the actuator so as to urge the actuator into a fully extended position; a closure cap coupled to a closure plate having an air inlet valve, wherein the bellows is coupled to the closure plate; a pump body coupled to the closure plate and/or the closure cap and wherein the pump body has a hollow cylindrical tube defining a liquid chamber, a radial flange coupled to the closure plate and extending away from the cylindrical tube, at least one vent aperture formed where the radial flange is joined to the cylindrical tube, and a liquid inlet sealed by a liquid inlet valve; a stem having a first end and coupled to the bellows and a second end coaxially received within the liquid chamber, wherein the stem is configured to deliver fluid from the liquid chamber into the mixing chamber; and a piston coupled to the second end of the stem, wherein the piston is configured to: (i) draw fluid through the liquid inlet and into the liquid chamber, when the actuator is returned to the fully extended position, and (ii) block a vent opening formed in the liquid chamber when the bellows is in a fully extended position. In this aspect, the pump also operates to that incoming air pathway flows sequentially from outside the pump (i) between the closure cap and the closure plate, (ii) through the air inlet valve, (iii) into the air chamber, (iv) between the bellows and actuator along a tortuous path, and (v) into the mixing chamber and also so that makeup air pathway flows sequentially from the air chamber (i) between closure plate and the pump body and (ii) through the vent aperture and wherein air flow through the makeup air pathway is caused by the bellows being compressed. It also includes any one or combination of the following, additional features:

- A locking collar for uplock captured between actuator and container;
- Wherein the locking collar is selectively coupled to the actuator head;
- One or more axial ribs formed on an inner facing of the locking collar and sliding between recesses on a periphery of the closure cap, wherein the locking collar rotatable relative to the closure cap so that the axial ribs lock the actuator in the fully extended position;
- Wherein the air inlet valve is a disc restrained proximate to the air inlet by projections on the closure plate;
- Wherein the bellow is a spiraling helix;
- Wherein the stem includes a coupling cylinder disposed at the first end;
- Wherein axial air passages are formed on an outer facing of the stem with the coupling cylinder surrounding the axial air passages;
- Wherein the first end and/or the coupling cylinder include gaps or crenellations;
- Wherein the closure plate includes at least one of a top facing annular engagement groove configured to couple to the bellows and bottom facing annular engagement groove configured to couple to the pump body;
- Wherein the vent aperture is partially blocked by the closure plate so as to redirect the air flow through the vent aperture in a non-horizontal direction (i.e., at an angle to horizontal);
- Wherein the second end of the stem terminates with one or more radially aligned inlet channels and wherein a wiper element on the piston is configured to sealingly engage an inner facing of the liquid chamber;
- Wherein the wiper element is spaced apart from the one or more radially aligned inlet channels so as to permit liquid to enter therein as the piston travels axially downward in the liquid chamber;
- Wherein the second end of the stem includes a shoulder configured to stop downward travel of the piston;
- Wherein coupling connections are made by way of bead and groove formations; and
- Wherein the incoming air pathway and/or the makeup air pathway incorporate grooves, projections, notches, or crenellations at an interface between discrete, abutting components.

A further aspect of the invention involves a method of dispensing foam having a desired consistency based upon an air-to-liquid ratio. Here, the method includes providing a foam dispenser system having a container with liquid, a reciprocating plunger, a compressible biasing member serving as the air chamber, and a rigid liquid cylinder, wherein liquid from the container is mixed with air when the reciprocating plunger is actuated; disposing a collar around the reciprocating plunger when the dispensing system is assembled and positioning the collar to dictate the volume of air drawn into the air chamber when the reciprocating plunger is actuated; and selecting an axial height for the collar that corresponds to an air-to-liquid ratio that produces a desired consistency of foam.

Still other aspects relate a reduced or all-plastic reciprocating pump for dispensing foam formed from a combination of liquid drawn from a container and air drawn from the ambient environment immediately around the pump. In these aspects, the pump has an actuator head and a pump engine having a biasing member that defines an air chamber and a liquid chamber, with the biasing member induces reciprocal axial motion to dispense a volume of foam formed from a specified ratio of air and liquid. Also, the pump has a ratio of total mass of the pump (expressed in grams) and the volume of dispensed foam (expressed in milliliters) is less than 18.0 and/or the ratio of air and liquid is between 8:1 and 15:1, the volume of dispensed foam is between 0.8 and 1.5 mL, and an inner diameter of a container neck to which the pump is affixed is between 28 and 40 mm.

All components of the pump dispenser should be made of materials having sufficient flexibility and structural integrity, as well as a chemically inert nature. Certain grades of polypropylene and polyethylene are particularly advantageous, especially in view of the absence of any thermosetting resins and/or different, elastomeric polymer blends. The materials should also be selected for workability, cost, and weight. Common polymers amenable to injection molding, extrusion, or other common forming processes should have particular utility.

References to coupling in this disclosure are to be understood as encompassing any of the conventional means used in this field. This may take the form of snap- or force fitting of components, although threaded connections, bead-and-groove, and slot-and-flange assemblies could be employed. Adhesive and fasteners could also be used, although such components must be judiciously selected so as to retain the recyclable nature of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A reciprocating pump for dispensing foam products, the pump comprising:

an actuator defining an outlet for dispensing a foam product;

a mixing chamber communicating with the outlet;

a resilient, compressible bellows defining an air chamber coupled to the actuator so as to urge the actuator into a fully extended position;

a closure cap coupled to a closure plate having an air inlet valve, wherein the bellows is coupled to the closure plate;

a pump body coupled to the closure plate and/or the closure cap and wherein the pump body has a hollow cylindrical tube defining a liquid chamber, a radial flange coupled to the closure plate and extending away from the cylindrical tube, at least one vent aperture formed where the radial flange is joined to the cylindrical tube, and a liquid inlet sealed by a liquid inlet valve;

a stem having a first end and coupled to the bellows and a second end coaxially received within the liquid chamber, wherein the stem is configured to deliver fluid from the liquid chamber into the mixing chamber;

a piston coupled to the second end of the stem, wherein the piston is configured to: (i) draw fluid through the liquid inlet and into the liquid chamber, when the actuator is returned to the fully extended position, and (ii) block a vent opening formed in the liquid chamber when the bellows is in a fully extended position; and wherein ambient air flows along a tortuous path and sequentially from outside the pump (i) between the closure cap and the closure plate, (ii) through the air inlet valve, (iii) into the air chamber, (iv) between the bellows and actuator, and (v) into the mixing chamber; and wherein make up air flows sequentially from the air chamber (i) between closure plate and the pump body and (ii) through the vent aperture and wherein air flow through the makeup air pathway is caused by the bellows being compressed.

2. The reciprocating pump of claim 1 further comprising a locking collar captured between actuator and container.

3. The reciprocating pump of claim 2 wherein the locking collar is selectively coupled to the actuator head.

4. The reciprocating pump of claim 2 wherein one or more axial ribs are formed on an the locking collar and sliding between recesses on a periphery of the closure cap, wherein the locking collar rotatable relative to the closure cap so that the axial ribs lock the actuator in the fully extended position.

5. The reciprocating pump of claim 1 wherein the air inlet valve is a disc restrained proximate to the air inlet by projections on the closure plate.

6. The reciprocating pump of claim 1 wherein the compressible bellows is a spiraling helix.

7. The reciprocating pump of claim 1 wherein the stem includes a coupling cylinder disposed at the first end.

8. The reciprocating pump of claim 7 wherein axial air passages are formed on an outer facing of the stem with the coupling cylinder surrounding the axial air passages.

9. The reciprocating pump of claim 7 wherein the first end and/or the coupling cylinder include gaps or crenellations.

10. The reciprocating pump of claim 1 wherein the closure plate includes at least one of a top facing annular engagement groove configured to couple to the bellows and bottom facing annular engagement groove configured to couple to the pump body.

11. The reciprocating pump of claim 1 wherein the vent aperture is partially blocked by the closure plate so as to redirect the air flow through the vent aperture in a non-horizontal direction and, more preferably, at an angle to horizontal.

12. The reciprocating pump of claim 1 wherein the second end of the stem terminates with one or more radially aligned inlet channels and wherein a wiper element on the piston is configured to sealingly engage a sidewall of the liquid chamber.

13. The reciprocating pump of claim 12 wherein the wiper element is spaced apart from the one or more radially aligned inlet channels so as to permit liquid to enter therein as the piston travels axially downward in the liquid chamber.

14. The reciprocating pump of claim 1 wherein any coupling connections within the reciprocating pump are made by way of bead and groove formations.

15. The reciprocating pump of claim 1 wherein the incoming air pathway and/or the makeup air pathway incorporate grooves, projections, notches, or crenellations at an interface between discrete, abutting components.

16. The reciprocating pump of claim 1 for dispensing foam formed from a combination of liquid drawn from a container and air drawn from ambient environment, the pump comprising:

wherein at least one of the following applies: (i) a ratio of total mass of the pump (expressed in grams) and (ii) the volume of dispensed foam (expressed in milliliters) is less than 18.0.

17. The reciprocating pump of claim 1 wherein the second end of the stem includes a shoulder configured to stop downward travel of the piston.

* * * * *